(12) United States Patent
Tanaka

(10) Patent No.: US 12,736,409 B2
(45) Date of Patent: Sep. 15, 2026

(54) BOLOMETER-TYPE INFRARED DETECTOR AND METHOD OF MANUFACTURING THE SAME

(71) Applicant: NEC Corporation, Tokyo (JP)

(72) Inventor: Tomo Tanaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 173 days.

(21) Appl. No.: 18/645,576

(22) Filed: Apr. 25, 2024

(65) Prior Publication Data

US 2024/0377261 A1 Nov. 14, 2024

(30) Foreign Application Priority Data

May 11, 2023 (JP) ................................ 2023-078294

(51) Int. Cl.
*G01J 5/08* (2022.01)
*G01J 5/20* (2006.01)

(52) U.S. Cl.
CPC ............... *G01J 5/0853* (2013.01); *G01J 5/20* (2013.01)

(58) Field of Classification Search
None
See application file for complete search history.

(56) References Cited

U.S. PATENT DOCUMENTS

2011/0303847 A1* 12/2011 Kurashina ............. G01J 5/0801 250/338.4
2012/0235038 A1* 9/2012 Nishikawa ........... G01N 21/359 250/338.3
2021/0160439 A1* 5/2021 Hosaka .................. H04N 23/23

FOREIGN PATENT DOCUMENTS

JP H09-257565 A 10/1997
JP 2015-049207 A 3/2015

* cited by examiner

*Primary Examiner* — Hoon K Song
(74) *Attorney, Agent, or Firm* — Sughrue Mion, PLLC

(57) ABSTRACT

To provide a bolometer-type infrared detector whose resistance value is not easily influenced by the external environment and which operates stably, and a method for manufacturing the same.

A bolometer-type infrared detector having a laminated structure in which a first protective film, a light reflective film and a second protective film are provided in this order on a heat-sensitive element, wherein the first protective film is made of at least one selected from the group consisting of a metal oxide film, a metal nitride film, a polyimide, an acrylic resin and a fluororesin;

the light reflective film is a metal film; and the second protective film is made of at least one selected from the group consisting of a metal oxide film, a metal nitride film, a polyimide, an acrylic resin, and a fluororesin.

10 Claims, 4 Drawing Sheets

BOLOMETER-TYPE INFRARED DETECTOR AND METHOD OF MANUFACTURING THE SAME

This application is based upon and claims the benefit of priority from Japanese patent application No. 2023-78294, filed on May 11, 2023, the disclosure of which is incorporated herein in its entirety by reference.

TECHNICAL FIELD

The present invention relates to a bolometer-type infrared detector and a method of manufacturing the same.

BACKGROUND ART

In recent years, there has been an increasing demand for infrared detectors for purposes such as heat detection and concentration measurement of carbon dioxide and air pollutants. A bolometer-type uncooled infrared detector changes the temperature of the light-receiving part by absorbing incident infrared rays, and detects the radiation intensity of the infrared rays from changes in resistance due to temperature changes of the material placed in the light-receiving part. Therefore, a bolometer type uncooled infrared detectors are inexpensive and have a variety of applications.

Currently, vanadium oxide and amorphous silicon are mainly used as heat-sensitive elements of bolometers (Patent Document 1). Further, the use of carbon nanotubes (CNTs), which have a high absolute value of temperature dependence of resistance change (temperature coefficient of resistance (TCR)), as a heat-sensitive element of a bolometer is also being considered (Patent Document 2).

CITATION LIST

Patent Literature

Patent Literature 1: Japanese Patent Application Publication No. H09-257565

Patent Literature 2: Japanese Patent Application Publication No. 2015-49207

SUMMARY OF INVENTION

Technical Problem

However, the above-mentioned heat-sensitive elements, especially CNTs, have the problem that their resistance value is easily influenced by the external environment due to electrical doping with oxygen and moisture in the atmosphere (reasons other than temperature changes are likely to cause resistance changes), so their operation as a detector is unstable.

In view of the above problems, the object of the present invention is to provide a bolometer-type infrared detector whose resistance value is not easily influenced by the external environment and which operates stably, and a method for manufacturing the same.

Solution to Problem

To achieve the above object, one embodiment of the present invention is a bolometer-type infrared detector having a laminated structure in which a first protective film, a light reflective film and a second protective film are provided in this order on a heat-sensitive element, wherein

- the first protective film is made of at least one selected from the group consisting of a metal oxide film, a metal nitride film, a polyimide, an acrylic resin and a fluororesin;
- the light reflective film is a metal film; and
- the second protective film is made of at least one selected from the group consisting of a metal oxide film, a metal nitride film, a polyimide, an acrylic resin, and a fluororesin.

Another embodiment of the present invention is a method for manufacturing a bolometer-type infrared detector comprising:

- preparing a substrate with an insulating surface;
- forming a heat-sensitive element support layer on the substrate;
- forming a heat-sensitive element on the heat-sensitive element support layer;
- forming an electrode pair on the heat-sensitive element;
- forming a first protective film on the heat-sensitive element;
- forming a light reflective film on the first protective film; and
- forming a second protective film on the light reflective film.

Advantageous Effect of Invention

According to the present invention, it is possible to provide a bolometer-type infrared detector whose resistance value is not easily influenced by the external environment and which operates stably, and a method for manufacturing the same.

DESCRIPTION OF EMBODIMENTS

Figure 1A:
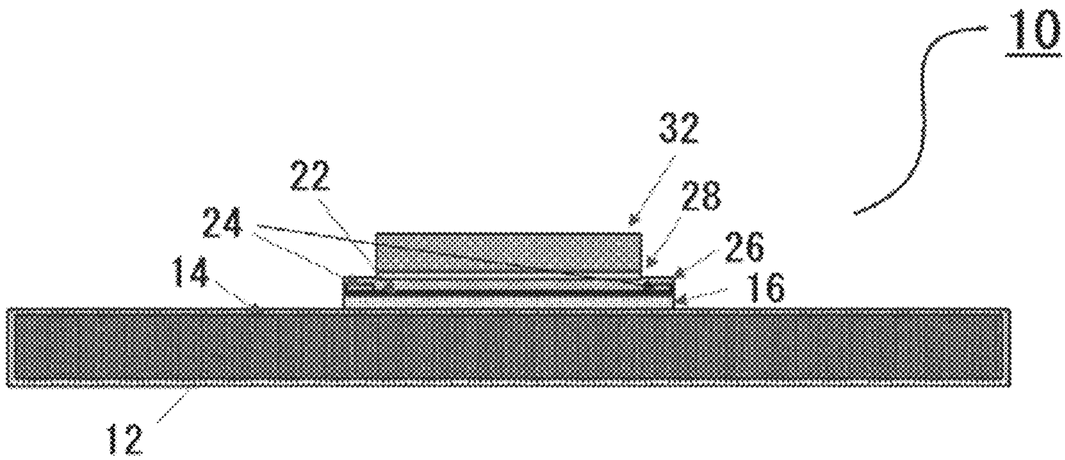
FIG. 1A is a sectional view schematically showing the structure of an infrared detector according to one embodiment of the present invention.

Embodiments of the present invention will be described below based on the drawings. Note that in each of the following embodiments, parts that are the same or equivalent to each other will be described with the same reference numerals.

<Bolometer-Type Infrared Detector>

The present invention is based on the discovery that the influence of the external environment on the heat-sensitive element can be reduced by optimizing the structure of the protective layer of the heat-sensitive element in an infrared detector. The bolometer-type infrared detector of the present invention has a laminated structure in which a first protective film, a light reflective film, and a second protective film are provided in this order on a heat-sensitive element.

Figure 1B:
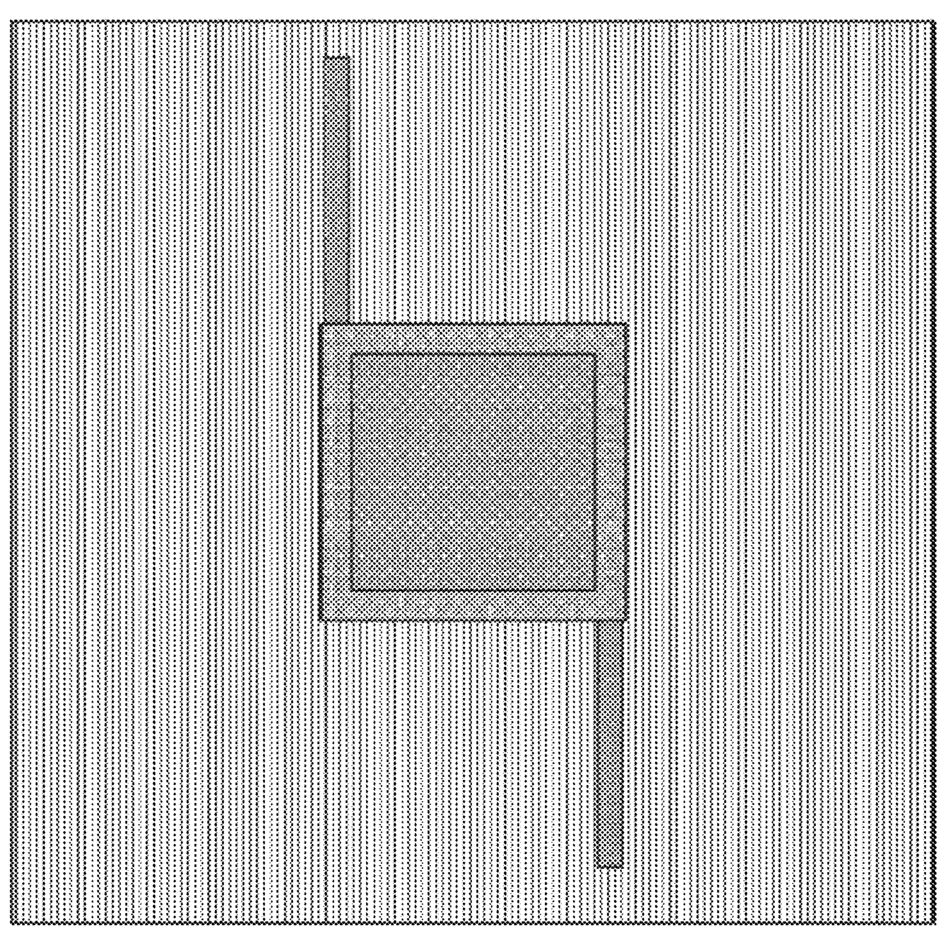
FIG. 1B is a plan view schematically showing the structure of the infrared detector according to one embodiment of the present invention.

An embodiment of the infrared detector of the present invention will be described with reference to FIG. 1. As shown in FIG. 1, the infrared detector 10 of this embodiment has a structure in which a heat-sensitive element support layer 16 is formed on a substrate with an insulating surface (for example, a heat-insulating layer 14, which is an insulating film, is formed on the surface of the substrate 12), and a heat-sensitive element 22 is formed on the heat-sensitive element support layer 16. Electrode pair 24 is formed at intervals on the heat-sensitive element 22, and each electrode of the electrode pair is electrically connected to the heat-sensitive element. As a result, an electrical path is formed between (one of the electrode pair)—(heat-sensitive element 22 (between the electrode pair))—(the other one of the electrode pair). A first protective film 26 is formed on the heat-sensitive element 22, a light reflective film 28 is formed on the first protective film 26, and a second protective film 32 is formed on the light reflective film 28. Each component of the infrared detector of the present invention will be explained below.

(Heat-Sensitive Element 22)

Examples of the heat-sensitive element include, but are not limited to, carbon nanotubes, vanadium oxide, amorphous silicon, and the like. The heat-sensitive element is preferably a carbon nanotube because it has a high TCR value. The carbon nanotube film is composed of a plurality of carbon nanotubes, preferably has a network-like structure, and functions as a bolometer film.

The thickness of the carbon nanotube film is not particularly limited, but is, for example, 1 nm or more, for example, several nm to 100 μm, preferably 10 nm to m, more preferably 50 nm to 1 μm. In one embodiment, the thickness of the carbon nanotube film is preferably from 20 nm to 500 nm, more preferably from 50 nm to 200 nm. If the thickness of the carbon nanotube film is 1 nm or more, good light absorption can be obtained. Further, it is preferable that the thickness of the carbon nanotube film is 1 μm or less, preferably 500 nm or less, from the viewpoint of simplifying the manufacturing method. Additionally, if the carbon nanotube film is too thick, the contact electrodes deposited from above may not make sufficient contact with the carbon nanotubes below the carbon nanotube film, resulting in a high effective resistance value. If the thickness of the carbon nanotube film is within the above range, an increase in resistance value can be suppressed. Further, it is preferable that the thickness of the carbon nanotube film is within the range of 10 nm to 1 μm, since printing technology can be suitably applied as a method for manufacturing the carbon nanotube film. The thickness of the carbon nanotube film can be determined as the average value of the thicknesses measured at ten arbitrary points on the carbon nanotube film.

Further, the density of the carbon nanotube film is not particularly limited, but for example, 0.3 g/cm$^3$ to 1.4 g/cm$^3$, preferably 0.8 g/cm$^3$ to 1.3 g/cm$^3$, more preferably 1.1 g/cm$^3$ to 1.2 g/cm$^3$. The density of the carbon nanotube film can be calculated from the weight, area, and thickness determined above of the carbon nanotube film.

Since the bolometer-type infrared detector 10 of the present invention has a light-reflecting film (a metal film) 28, the light is mainly absorbed by a second protective film (a light-absorbing film) 32 and does not reach the heat-sensitive element 22 much, as will be described later. Therefore, the thickness and density of the heat-sensitive element 22 are not limited to the range necessary for light absorption, but can be set to a range that optimizes the resistance value and TCR value, or a range that is easy to manufacture.

In addition, in addition to the above-mentioned components, for example, negative thermal expansion materials, ion conductive agents (surfactants, ammonium salts, inorganic salts), resins, organic binders may be appropriately used in the carbon nanotube film.

The content of carbon nanotubes in the carbon nanotube film can be selected as appropriate, but preferably 0.1% by mass or more, more preferably 1% by mass or more, for example, it is preferably 30% by mass or more, or 50% by mass or more, and in some cases, 60% by mass or more, based on the total mass of the carbon nanotube film.

An example of a method for manufacturing a carbon nanotube film will be described in detail below.

A carbon nanotube film can be formed by applying a dispersion liquid in which carbon nanotubes are dispersed onto a heat-sensitive element support layer, drying it, and optionally performing heat treatment.

The carbon nanotube dispersion liquid preferably contains a surfactant in addition to carbon nanotubes. The surfactant contained in the carbon nanotube dispersion liquid is preferably a nonionic surfactant. Unlike ionic surfactants, nonionic surfactants have a weak interaction with carbon nanotubes and can be easily removed after providing a dispersion liquid on a substrate. Therefore, a stable carbon nanotube conductive path can be formed and an excellent TCR value can be obtained. In addition, nonionic surfactants with long molecular lengths can maintain a network state because the distance between carbon nanotubes increases when a dispersion liquid is provided on a substrate, and the carbon nanotubes are less likely to re-agglomerate after water evaporates.

Nonionic surfactant can be selected as appropriate, but it is preferable to use one or a combination of nonionic surfactants composed of a hydrophilic moiety that does not ionize and a hydrophobic moiety such as an alkyl chain, for example, nonionic surfactants with a polyethylene glycol structure represented by polyoxyethylene alkyl ether, and alkyl glucoside nonionic surfactants. As such a nonionic surfactant, polyoxyethylene alkyl ether is preferably used. Further, the alkyl portion may contain one or more unsaturated bonds. In particular, polyoxyethylene (23) lauryl ether, polyoxyethylene (20) cetyl ether, polyoxyethylene (20) stearyl ether, polyoxyethylene (10) oleyl ether, polyoxyethylene (10) cetyl ether, polyoxyethylene (10) stearyl ether, polyoxyethylene (20) oleyl ether, and polyoxyethylene (100) stearyl ether are more preferred. Also, N,N-bis[3-(D-gluconamido)propyl]deoxycholamide, n-dodecyl β-D-maltoside, octyl β-D-glucopyranoside, and digitonin can be used.

Polyoxyethylene sorbitan monostearate (molecular formula: $C_{64}H_{126}O_{26}$, for example, product name: Tween 60 manufactured by Sigma-Aldrich), polyoxyethylene sorbitan trioleate (molecular formula: $C_{24}H_{44}O_6$, for example, product name: Tween 85 manufactured by Sigma-Aldrich), octylphenol ethoxylate (molecular formula: $C_{14}H_{22}O(C_2H_4O)_n$, n=1 to 10, for example, product name: Triton X-100 manufactured by Sigma-Aldrich), polyoxyethylene (40) isooctyl phenyl ether (molecular formula: $C_8H_{17}C_6H_4O(CH_2CH_2O)_{40}H$, for example, product name: Triton X-405 manufactured by Sigma-Aldrich), Poloxamer (molecular formula: $C_5H_{10}O_2$, for example, product name: Pluronic manufactured by Sigma-Aldrich), polyvinylpyrrolidone (molecular formula: $(C_6H_9NO)n$, n=5 to 100 manufactured by Sigma-Aldrich) and the like can also be used as the nonionic surfactant.

The concentration of the surfactant in the carbon nanotube dispersion liquid can be controlled as appropriate, and is preferably from the critical micelle concentration to about 5% by mass, and more preferably from 0.001% to 3% by mass. The concentration of the surfactant in the carbon nanotube dispersion liquid is particularly preferably 0.01 to 1% by mass in order to suppress re-agglomeration after coating. If the concentration of the surfactant in the carbon nanotube dispersion liquid is less than the critical micelle concentration, it is not preferable because the dispersion cannot be achieved. In the present specification, critical micelle concentration (CMC) refers to the concentration at which the surface tension inflects, when the surface tension was measured by varying the concentration of the surfactant aqueous solution at 25 °C under atmospheric pressure using a surface tension meter such as a Wilhelmy surface tension meter.

The dispersion medium for the carbon nanotube dispersion is not particularly limited as long as it can preferably disperse and suspend carbon nanotubes, but examples include water, heavy water, organic solvents, or mixtures thereof, with water being preferred.

The method for obtaining the carbon nanotube dispersion liquid is not particularly limited, and conventionally known methods can be applied. For example, a carbon nanotube dispersion liquid (micelle dispersion solution) is prepared by mixing a carbon nanotube mixture, a dispersion medium, and a nonionic surfactant to prepare a solution containing carbon nanotubes, and treating the solution with ultrasound to disperse the carbon nanotubes. In addition to or in place of the ultrasonic treatment, a carbon nanotube dispersion method using mechanical shearing force may be used. Mechanical shearing may be performed in the gas phase. In a micelle-dispersed aqueous solution of carbon nanotubes and a nonionic surfactant, carbon nanotubes are preferably in an isolated state. Therefore, if necessary, bundles, amorphous carbon, and impurity catalysts may be removed using ultracentrifugation treatment. During the dispersion treatment, the carbon nanotubes can be cut, and the length can be controlled by changing the pulverization conditions, ultrasonic output, and ultrasonic treatment time of the carbon nanotubes. For example, untreated carbon nanotubes can be ground with tweezers or a ball mill to control the aggregate size. After these treatments, the length of carbon nanotubes is controlled to 100 nm to 5 μm by processing with an ultrasonic homogenizer at an output of 40 to 600 W, optionally 100 to 550 W, 20 to 100 KHz, and a processing time of 1 to 5 hours, preferably 1 to 3 hours. If the treatment time with the ultrasonic homogenizer is shorter than 1 hour, depending on the conditions, the carbon nanotubes may hardly be dispersed and may remain almost at their original length. Further, from the viewpoint of shortening the processing time and reducing costs, the processing time is preferably 3 hours or less.

Surface functional groups are generated on the surfaces or ends of the carbon nanotubes by dispersing and cutting the carbon nanotubes. The functional groups produced include carboxyl groups, carbonyl groups, and hydroxyl groups. If the treatment is in the liquid phase, carboxyl groups and hydroxyl groups are generated, and if the treatment is in the gas phase, carbonyl groups are generated.

Separation of carbon nanotubes can be performed, for example, by an electric field induced layer formation method (ELF method: see, for example, K. Ihara et al. J. Phys. Chem. C. 2011, 115, 22827-22832, Japanese Patent No. 5717233, which documents are incorporated herein by reference). An example of the separation method using the ELF method will be described. Carbon nanotubes, preferably single-walled carbon nanotubes, are dispersed with a nonionic surfactant, the dispersion is placed in a vertical separation device, and a voltage is applied to electrodes arranged above and below to separate them by carrier-free electrophoresis. The separation mechanism can be presumed, for example, as follows. When carbon nanotubes are dispersed with a nonionic surfactant, semiconducting carbon nanotube micelles have a negative zeta potential, while metallic carbon nanotube micelles have an opposite sign (positive) zeta potential (in recent years, metallic carbon nanotube micelles are also believed to have a slightly negative zeta potential or be nearly uncharged). Therefore, when an electric field is applied to the carbon nanotube dispersion liquid, the conductive carbon nanotube micelles are electrophoresed toward the anode (+) and the metallic carbon nanotube micelles are electrophoresed toward the cathode (−) due to the difference in zeta potential. Ultimately, a layer of concentrated semiconducting carbon nanotubes is formed near the anode, and a layer of concentrated metallic carbon nanotubes is formed near the cathode in the separation tank. The separation voltage can be appropriately set in consideration of the composition of the dispersion medium, the charge amount of the carbon nanotubes, and the like, and is preferably 1 V or more and 200 V or less, more preferably 10 V or more and 200 V or less. A voltage of 100 V or more is preferable from the viewpoint of shortening the time of the separation process. In addition, from the viewpoint of suppressing the generation of bubbles during separation and maintaining the separation efficiency, the voltage is preferably 200 V or less. Purity is improved by repeating the separation. The dispersion liquid after separation may be reset to the initial concentration and the same separation operation may be performed. Thereby, it can be further purified.

A dispersion liquid in which semiconducting carbon nanotubes having desired diameters and lengths are concentrated can be obtained by the dispersing/cutting and separating of carbon nanotube described above. In this specification, a carbon nanotube dispersion in which semiconducting carbon nanotubes are concentrated may be referred to as a "semiconducting carbon nanotube dispersion liquid". The semiconducting carbon nanotube dispersion liquid obtained by the separation step means a dispersion liquid comprising generally 67% by mass or more, preferably 70% by mass or more, more preferably 80% by mass or more, particularly preferably 90% by mass or more, more preferably 95% by mass or more, still more preferably 99% by mass or more (t the upper limit may be 100% by mass) of semiconducting carbon nanotubes in the total amount of carbon nanotubes. The tendency of metallic and semiconducting carbon nanotubes to separate can be analyzed by microscopic Raman spectrometry and ultraviolet-visible-near-infrared spectrophotometry.

A centrifugal separation process may be performed to remove bundles, amorphous carbon, metal impurities, and the like from the carbon nanotube dispersion liquid after the above-described carbon nanotube dispersion/cutting process and before the separation process. The centrifugal acceleration can be appropriately adjusted, but is preferably 10,000×g to 500,000×g, more preferably 50,000×g to 300,000×g, and optionally may be 100,000×g to 300,000×g. The centrifugation time is preferably 0.5 to 12 hours, more preferably 1 to 3 hours. The centrifugation temperature can be appropriately adjusted, but is preferably 4° C. to room temperature, more preferably 10° C. to room temperature.

The method of applying the carbon nanotube dispersion liquid to the insulating film 18 is not particularly limited, and examples thereof include drop coating, spin coating, printing, inkjet, spray coating, dip coating, and the like. From the viewpoint of reducing manufacturing costs, the printing method is preferable. Examples of printing methods include coating (dispenser and inkjet), transfer (microcontact printing and gravure printing), and the like.

A carbon nanotube film 22 can be formed by drying and heat-treating the carbon nanotube dispersion liquid coated on the insulating film to remove the surfactant and solvent. The temperature of the heat treatment can be set appropriately above the decomposition temperature of the surfactant, but is preferably 150 to 500 °C, more preferably 200 to 500 °C, for example 200 to 400 °C It is more preferable that the temperature of the heat treatment is 200 °C or higher because it is easier to suppress the residual decomposition products of the surfactant. Further, it is preferable that the temperature of the heat treatment is 5000 °C or lower, for example 400 °C or lower, since deterioration of the substrate and other components can be suppressed. Further, it is possible to suppress decomposition and size change of carbon nanotubes and separation of functional groups.

Carbon nanotubes can form, for example, parallel linear, fibrous, and network-like structures, but preferably form a three-dimensional network-like structure that is difficult to aggregate and provides a uniform conductive path.

As the carbon nanotube, single-walled, double-walled, or multi-walled carbon nanotubes can be used, but single-walled or several-walled (for example, two-walled or three-walled) carbon nanotubes are preferred, and single-walled carbon nanotubes are more preferred. The carbon nanotubes preferably contain 80% by mass or more of single-walled carbon nanotubes, more preferably 90% by mass or more (including 100% by mass).

It is preferable to use semiconducting carbon nanotubes having a large band gap and carrier mobility for the carbon nanotube film. The content of semiconducting carbon nanotubes, preferably semiconducting single-walled carbon nanotubes, is generally 67% by mass or more, preferably 70% by mass or more, more preferably 80% by mass or more of the total amount of carbon nanotubes. In particular, the semiconducting carbon nanotubes are preferably contained in a ratio of 90% by mass or more, more preferably 95% by mass or more, and even more preferably 99% by mass or more (including 100% by mass) of the total amount of carbon nanotubes.

The diameter of the carbon nanotubes is preferably between 0.6 and 1.5 nm, more preferably between 0.6 and 1.2 nm, and more preferably between 0.7 and 1.1 nm, from the viewpoint of increasing the bandgap and improving the TCR. Also, in one embodiment, the diameter of the carbon nanotubes may be preferably 1 nm or less. If the diameter of the carbon nanotubes is 0.6 nm or more, they are easier to manufacture. If the diameter of the carbon nanotubes is 1.5 nm or less, the bandgap can be easily maintained within an appropriate range, and a high TCR can be obtained.

In the present specification, the diameter of the carbon nanotubes is measured by observing the carbon nanotube film using an atomic force microscope (AFM) and measuring the diameter at about 100 points, and 60% or more, preferably 70%. % or more, optionally preferably 80% or more, more preferably 100% of them have a diameter of 0.6 to 1.5 nm. Preferably, 60% or more, preferably 70% or more, optionally preferably 80% or more, more preferably 100% of the diameter of the carbon nanotube is within the range of 0.6 to 1.2 nm, more preferably within the range of 0.7 to 1.1 nm. Also, in one embodiment, 60% or more, preferably 70% or more, optionally preferably 80% or more, and more preferably 100% are within the range of 0.6 to 1 nm.

Further, the length of the carbon nanotubes is more preferably between 100 nm and 5 μm because it is easy to disperse and is excellent in coatability. From the viewpoint of the conductivity of carbon nanotubes, the length of the carbon nanotubes is preferably 100 nm or more. Also, if the length of the carbon nanotubes is 5 μm or less, it is easy to suppress aggregation during film formation. The length of the carbon nanotubes is more preferably 500 nm to 3 μm, still more preferably 700 nm to 1.5 μm.

In the present specification, the length of the carbon nanotubes is measured by observing at least 100 carbon nanotubes using an atomic force microscope (AFM) and counting them to measure the length distribution of carbon nanotubes, and 60% or more, preferably 70%. % or more, optionally preferably 80% or more, more preferably 100% of them have a length of 100 nm to 5 μm. Preferably, 60% or more, preferably 70% or more, optionally preferably 80% or more, more preferably 100% of the length of the carbon nanotubes is within the range of 500 nm to 3 μm, more preferably, 60% or more, preferably 70% or more, optionally preferably 80% or more, and more preferably 100% is within the range of 700 nm to 1.5 μm.

When the diameter and length of the carbon nanotube are within the above ranges, the effect of semiconducting properties is increased, and a large current value can be obtained, so that when used as a bolometer film, a high TCR value is likely to be obtained.

The carbon nanotubes used in the carbon nanotube dispersion may be heat-treated in vacuum under an inert atmosphere to remove surface functional groups, impurities such as amorphous carbon, catalysts, and the like. The heat treatment temperature can be selected as appropriate, but is preferably 800 to 2000 °C, more preferably 800 to 1200 °C (First Protective Film 26)

The first protective layer is a film that is present directly above the heat-sensitive element. The first protective film is made of at least one selected from the group consisting of a metal oxide film, a metal nitride film, polyimide, an acrylic resin, and a fluororesin. Preferably, the first protective film is made of oxide of at least one metal selected from the group consisting of Si, Hf, Y, La, and Ta and/or nitride of at least one metal selected from the group consisting of Si, Hf, Y, La, and Ta. It is particularly preferable that the first protective film is made of a silicon oxide film and/or a silicon nitride film. The thickness of the first protective film can be appropriately set depending on the material, but is preferably 1 to 1000 nm, more preferably 1 to 500 nm, and particularly preferably 1 to 100 nm. When the thickness of the first protective film is within the above range, a sufficient protective effect of the heat-sensitive element can be obtained.

(Light Reflective Film (Metal Film) 28)

The light reflective film is a film that exists directly on the first protective film. The light reflective film is a metal film, and is preferably a film of at least one metal with high reflectivity selected from the group consisting of Au, Ag, Al, Cr, Ni, and Pt. The thickness of the light reflective film can be appropriately set depending on the material, but is preferably 1 to 1000 nm, more preferably 5 to 500 nm, and particularly preferably 10 to 300 nm. When the thickness of the light reflective film is within the above range, it is possible to obtain a sufficient protection effect for the heat-sensitive element, and also to obtain a sufficient light-reflection effect.

(Second Protective Film (Light Absorption Film) 32)

The second protective layer is a film that is present directly above the light reflective film. The second protective film has the effect of suppressing doping of the heat-sensitive element due to adsorption of oxygen and moisture in the atmosphere. As the second protective film, it is preferable to use a material that functions as both of a protective film and a light absorption film. The second protective film is made of at least one selected from the group consisting of a metal oxide film, a metal nitride film, polyimide, an acrylic resin, and a fluororesin. Preferably, the second protective film is made of oxide of at least one metal selected from the group consisting of Si, Hf, Y, La, and Ta and/or nitride of at least one metal selected from the group consisting of Si, Hf, Y, La, and Ta. It is particularly preferable that the second protective film is made of a silicon oxide film and/or a silicon nitride film. The thickness of the second protective film can be appropriately set depending on the material, but is preferably 1 to 1000 nm, more preferably 100 to 1000 nm, and particularly preferably 500 to 1000 nm. When the thickness of the second protective film is within the above range, a sufficient effect of protecting the heat-sensitive element and a sufficient effect of absorbing infrared rays can be obtained. Furthermore, if necessary, an absorber such as niello may be optionally provided on the second protective film. When a niello film is provided, the thickness of the second protective film may be 10 to 100 nm.

The bolometer-type infrared detector of the present invention can have three functions: a heat-sensitive element protection function, an infrared absorption function, and a light reflection function, because it has a three-layer structure of a first protective film/a light reflective film/a second protective film on top of a heat-sensitive element. A portion of the light incident from the top surface is absorbed by the second protective film 32, and the unabsorbed light is reflected by the light reflective film 28, returns to the second protective film 32, and is absorbed. That is, most of the incident light is absorbed by the second protective film (light absorption film) 32. At this time, the second protective film 32 generates heat due to the absorbed light, and this heat also warms the heat-sensitive element 22, changing its resistance value.

The bolometer-type infrared detector of the present invention may have a structure in which the laminated structure of the three layers (a first protective film/a light reflective film/a second protective film) is repeated multiple times.

(Electrode Pair 24)

The material of the electrode pair may be appropriately selected in consideration of the bondability with the heat-sensitive element, for example, single metals such as titanium, gold, platinum, aluminum, copper, silver, tungsten, and cobalt, or alloys containing at least one of these metals can be used alone or in combination. Although the method for producing the electrode pair is not particularly limited, it can be formed by, for example, vapor deposition, sputtering, or printing. If necessary, masking of regions where electrode pairs are not to be formed may be performed in advance. The thickness of the electrode pair can be adjusted as appropriate, but is preferably 30 to 300 nm, more preferably 50 to 200 nm. Further, the distance between the two electrodes is preferably 2 to 100 μm, and more preferably 2 to 10 μm in order to miniaturize the infrared detector.

(Heat-Sensitive Element Support Layer 16)

The material of the heat-sensitive element support layer is not particularly limited, and examples thereof include silicon oxide ($SiO_2$), silicon nitride film (SiN), and the like. The method of forming the heat-sensitive element support layer is not particularly limited, and can be appropriately selected depending on the material used.

(Substrate 12)

The material constituting the substrate 12 may be an inorganic material or an organic material, and materials used in the art can be used without particular limitation. Examples of inorganic materials include, but are not limited to, glass, Si, $SiO_2$ and SiN. Examples of organic materials include, but are not limited to, plastics and rubbers such as polyimide, polyethylene, polypropylene, polystyrene, polyvinyl chloride, polyethylene terephthalate, acrylonitrile styrene resin, acrylonitrile butadiene styrene resin, fluororesin, methacrylic resin and polycarbonate.

(Heat-Insulating Layer 14)

The heat-insulating layer 14 is made of resin with high heat insulation properties (low thermal conductivity). By covering the substrate surface with a highly insulating resin, heat dissipation from the carbon nanotube film can be suppressed. The thermal conductivity of the resin constituting the heat-insulating layer is generally 0.3 W/mK or less, preferably 0.15 W/mK or less, and more preferably 0.1 W/mK or less depending on the case. Since it is preferable that the thermal conductivity is lower, the lower limit is not particularly limited, but is, for example, 0.02 W/mK or more, and in some cases 0.05 W/mK or more. In particular, it is preferable that the thermal conductivity of the heat-insulating layer at least in the vertical direction (i.e., layering direction) is within the above range. In the present specification, the thermal conductivity can be a value determined at 25 °C according to a standard method (ASTM C177, ASTM E1461).

The thickness of the heat-insulating layer may be appropriately set in consideration of the resin components used, but it is preferably 10 to 1000 μm, more preferably 20 to 700 μm, and even more preferably 50 to 200 μm. When the thickness of the heat-insulating layer is within the above range, sufficient heat insulating properties can be obtained.

Although the resin used for the heat-insulating layer is not particularly limited, parylene can be mentioned. Parylene is a general term for paraxylene polymers, and has a structure in which benzene rings are connected via $CH_2$. Examples of parylene include those formed from dimers represented by the following formula:

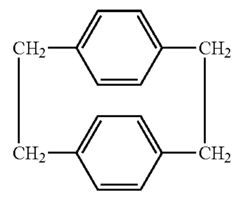 [SMILES: c1cc2ccc1CCc1ccc(cc1)CC2]

In the above formula, at least one hydrogen atom of at least one benzene ring may be substituted with a halogen atom. Examples of the halogen include fluorine (F), chlorine (Cl), bromine (Br), and iodine (I), with chlorine being preferred. The number of substitutions by halogen is 8 or less, preferably 6 or less, and more preferably 4 or less.

Examples of parylene include parylene N, parylene C, parylene D, parylene HT and ParyFree. Among them, parylene C (thermal conductivity: 0.084 (W/mK)) is preferred because it has the lowest thermal conductivity. Parylene is chemically stable and has excellent moisture, chemical and insulation barrier properties. Parylene coatings also have excellent temperature stability, mechanical properties, and tensile strength.

The method of forming the heat-insulating layer is not particularly limited, and can be appropriately selected depending on the resin used. For example, when parylene is used, a parylene film can be formed by coating parylene on a substrate using a vacuum evaporation device. Specifically, when a solid dimer is heated under vacuum, it vaporizes and becomes a dimer gas. This gas is thermally decomposed and the dimer cleaves into monomer form. In a room temperature deposition chamber, this monomer gas polymerizes on all surfaces, forming a thin, transparent polymer film. If necessary, before performing the vapor deposition process, the substrate may be pretreated, cleaned, and areas not to be vaporized may be masked.

The bolometer-type infrared detector of the present invention can be particularly suitably used for detecting electromagnetic waves having a wavelength of 0.7 μm to 1 mm, for example, in addition to infrared light. Electromagnetic waves included in the above wavelength range include infrared rays and terahertz waves.

EXAMPLES

The present invention will be specifically explained below using Examples, but the present invention is not limited to Examples.

Example 1

Figure 2A:
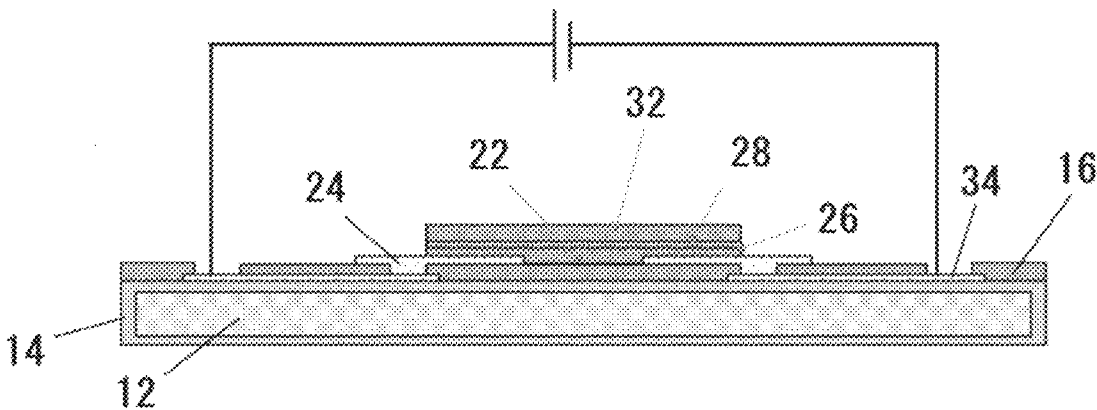
FIG. 2A is a sectional view showing the structure of the infrared detector of Example 1.

A substrate having an insulating surface was prepared by forming a heat-insulating layer 14, which is an insulating film, on the surface of the substrate 12. Wiring 34 was formed on the substrate. A heat-sensitive element support layer 16 was formed thereon, and a heat-sensitive element 22 was formed on the heat-sensitive element support layer 16. The two electrodes of the electrode pair 24 were spaced apart from each other, and the electrode pair 24 was formed to be electrically connected to the heat-sensitive element 22. Further, a first protective film 26, a light reflecting film 28, and a second protective film 32 were formed in this order on the heat-sensitive element 22. As a result, a bolometer-type infrared detector having the structure shown in FIG. 2A was formed (the heat-sensitive element: carbon nanotubes with a thickness of 5 nm; the first protective film: a silicon oxide film with a thickness of 45 nm; the light reflective film: a titanium film with a thickness of 5 nm; the second protective film: a silicon oxide film with a thickness of 45 nm). The structure is such that current can be supplied from the outside to the electrode pair 24, and an electrical path is formed between one electrode of the electrode pair, the heat-sensitive element, and the other electrode of the electrode pair.

Comparative Example 1

Figure 2B:
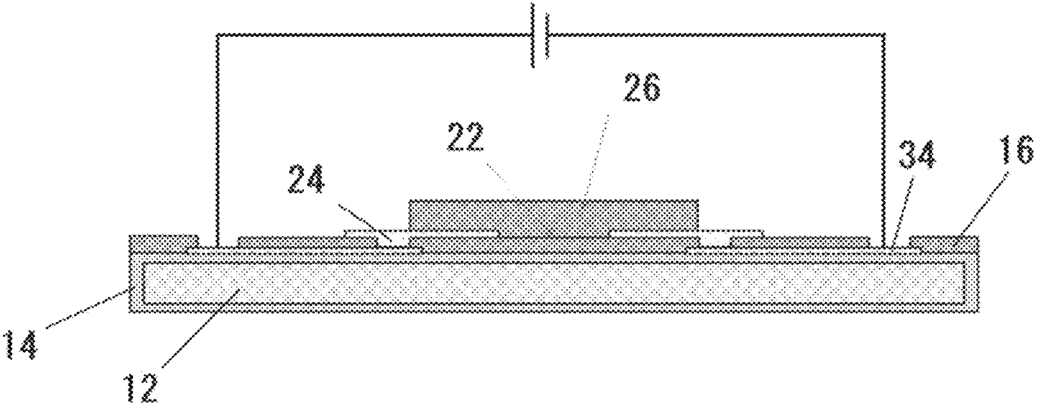
FIG. 2B is a sectional view showing the structure of the infrared detector of Comparative Example 1.

A substrate having an insulating surface was prepared by forming a heat-insulating layer 14, which is an insulating film, on the surface of the substrate 12. Wiring 34 was formed on the substrate. A heat-sensitive element support layer 16 was formed thereon, and a heat-sensitive element 22 was formed on the heat-sensitive element support layer 16. The two electrodes of the electrode pair 24 were spaced apart from each other, and the electrode pair 24 was formed to be electrically connected to the heat-sensitive element 22. Further, a protective film 26 was formed on the heat-sensitive element 22. As a result, a bolometer-type infrared detector having the structure shown in FIG. 2B was formed (the thermal element: carbon nanotubes with a thickness of 5 nm, the protective film: a silicon oxide film with a thickness of 100 nm). The structure is such that current can be supplied from the outside to the electrode pair 24, and an electrical path is formed between one electrode of the electrode pairs, the heat-sensitive element, and the other electrode of electrode pair.

In general, when a heat-sensitive element (carbon nanotube) is exposed to the atmosphere, oxygen and moisture are adsorbed to the surface and the resistance value decreases, and when the element is vacuumed, the adsorbed oxygen and moisture are released and the resistance value increases. In order to provide a bolometer-type infrared detector that operates stably, it is important that the resistance value is not easily influenced by the external environment. Regarding the relationship between resistance value (R), voltage (V), and current (I), V is the product of R and I. Therefore, it is possible to investigate the influence of the external environment on the resistance value by measuring the current under both of air and vacuum. 1V was applied to the infrared detectors of Example 1 and Comparative Example 1, and the currents were measured in the atmosphere and in vacuum. Three elements were measured for each structure.

Figure 3:
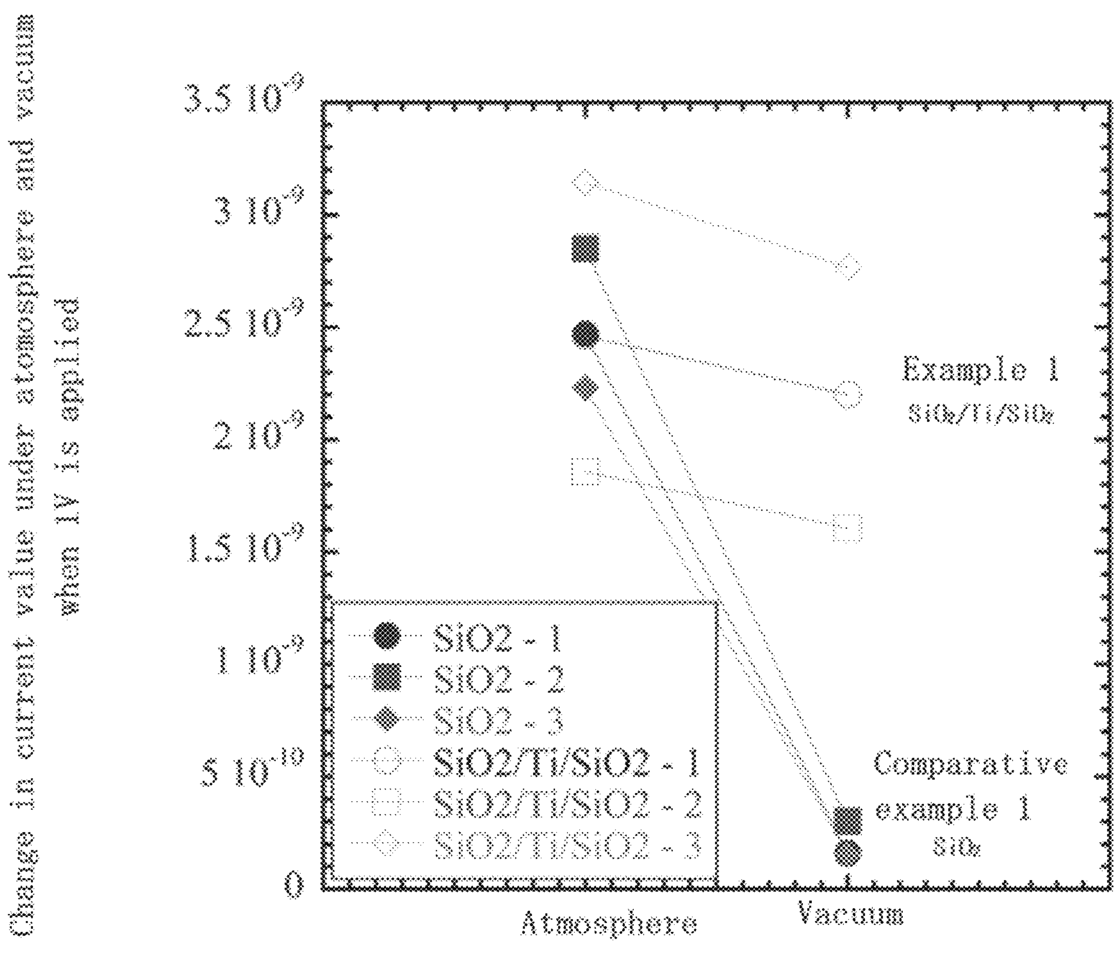
FIG. 3 is a graph showing changes in current values under air and vacuum when 1 V is applied to the infrared detectors of Example 1 and Comparative Example 1.
Figure 4:
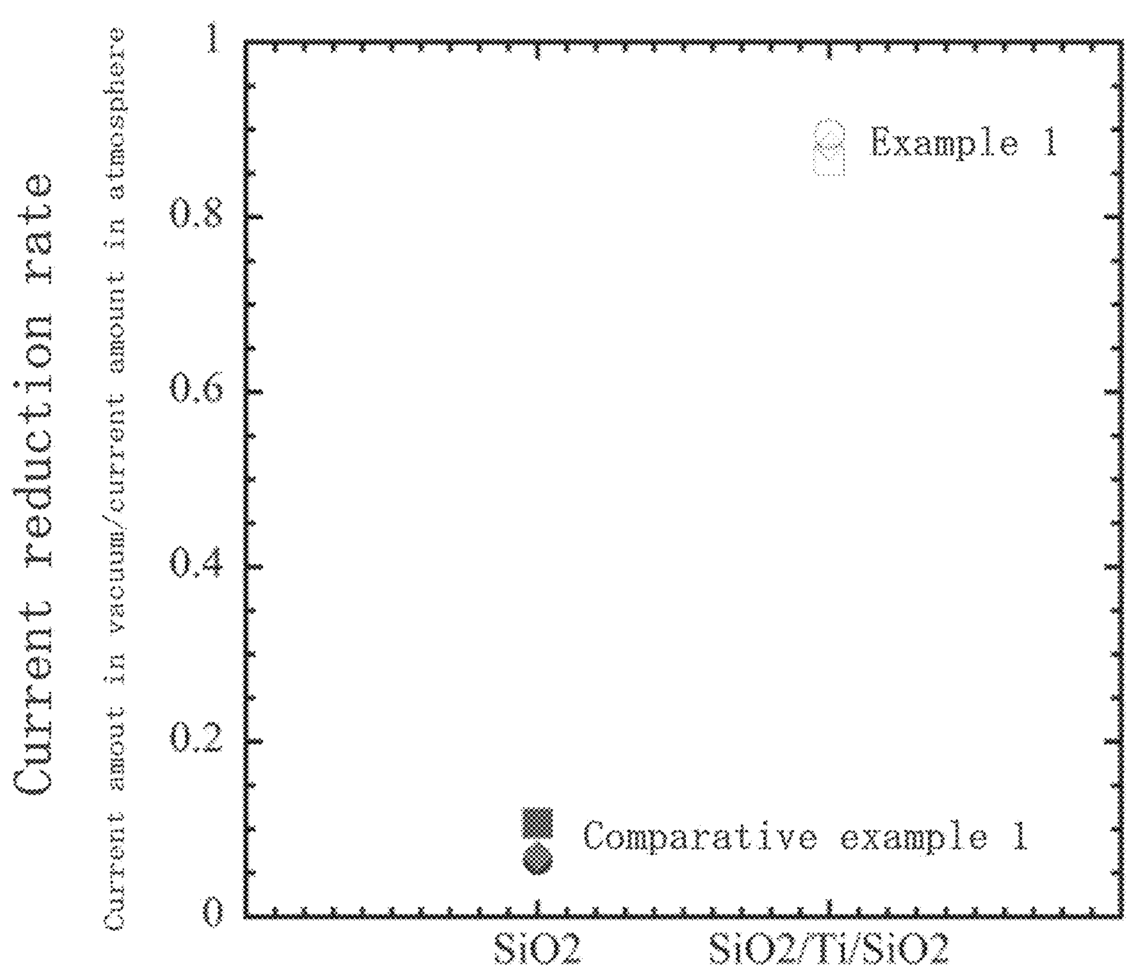
FIG. 4 is a graph showing the current reduction rate of the infrared detectors of Example 1 and Comparative Example 1.

FIG. 3 shows the measurement results of the current, and FIG. 4 shows the ratio of the amount of current in vacuum to the amount of current in atmosphere. The open symbols indicate Example 1, and the filled symbols indicate Comparative Example 1. In the structure shown in Comparative Example 1 (having a simple oxide film on the heat-sensitive element), the protective effect of the heat-sensitive element was not sufficient, and the current increased significantly (in other words, the resistance value decreased significantly) in the atmosphere compared to in the vacuum condition. On the other hand, by adopting the structure shown in Example 1 (i.e., the laminated structure in which the top of the heat-sensitive element is a first protective film, a light reflective film and a second protective film), the heat-sensitive element could be sufficiently protected, and the change in current (in other words, the change in resistance value) between vacuum and atmospheric conditions was reduced. Therefore, it was confirmed that by forming the protective film into a three-layer structure of the first protective film (nitride film or oxide film)/the light reflective film (metal film)/the second protective film (nitride film or oxide film), there is an effect of suppressing fluctuations in the resistance value due to the influence of the atmosphere.

Although the present invention has been described above with reference to the embodiments and examples, the present invention is not limited to the above embodiments and examples. The configuration and details of the present invention may be modified in various ways within the scope of the present invention by one skilled in the art.

Supplementary Note 1

A bolometer-type infrared detector having a laminated structure in which a first protective film, a light reflective film and a second protective film are provided in this order on a heat-sensitive element, wherein the first protective film is made of at least one selected from the group consisting of a metal oxide film, a metal nitride film, a polyimide, an acrylic resin and a fluororesin;

the light reflective film is a metal film; and the second protective film is made of at least one selected from the group consisting of a metal oxide film, a metal nitride film, a polyimide, an acrylic resin, and a fluororesin.

Supplementary Note 2

The bolometer-type infrared detector according to Supplementary note 1, wherein the metal oxide film is a silicon oxide film.

Supplementary Note 3

The bolometer-type infrared detector according to Supplementary note 1 or 2, wherein the metal nitride film is a silicon nitride film.

Supplementary Note 4

The bolometer-type infrared detector according to any one of preceding supplementary notes, wherein the metal film is a titanium film.

Supplementary Note 5

The bolometer-type infrared detector according to any one of preceding supplementary notes, wherein the heat-sensitive element is a carbon nanotube film.

Supplementary Note 6

The bolometer-type infrared detector according to any one of preceding supplementary notes, wherein the thickness of the first protective film is 1 to 1000 nm.

Supplementary Note 7

The bolometer-type infrared detector according to any one of preceding supplementary notes, wherein the thickness of the second protective film is 1 to 1000 nm.

Supplementary Note 8

The bolometer-type infrared detector according to any one of preceding supplementary notes, wherein the thickness of the light reflective film is 1 to 1000 nm.

Supplementary Note 9

The bolometer-type infrared detector according to any one of preceding supplementary notes, further comprising a niello film on the second protective film.

Supplementary Note 10

The bolometer-type infrared detector according to any one of preceding supplementary notes, having a structure in which the laminated structure is repeated multiple times.

Supplementary Note 11

The bolometer-type infrared detector according to any one of preceding supplementary notes, wherein the heat-sensitive element is provided on the heat-sensitive element support layer.

Supplementary Note 12

The bolometer-type infrared detector according to any one of preceding supplementary notes, having an electrode pair on the heat-sensitive element.

Supplementary Note 13

The bolometer-type infrared detector according to any one of preceding supplementary notes, wherein the heat-sensitive element support layer is provided on a substrate with an insulating surface.

Supplementary note 14

A method for manufacturing a bolometer-type infrared detector comprising:

preparing a substrate with an insulating surface;

forming a heat-sensitive element support layer on the substrate;

forming a heat-sensitive element on the heat-sensitive element support layer;

forming an electrode pair on the heat-sensitive element;

forming a first protective film on the heat-sensitive element;

forming a light reflective film on the first protective film; and forming a second protective film on the light reflective film.

EXPLANATION OF REFERENCE

10 Bolometer-type infrared detector
12 Substrate
14 Heat-insulating layer
16 Heat-sensitive element support layer
22 Heat-sensitive element
24 Electrode pair
26 First protective film
28 Light reflective film
32 Second protective film
34 Wiring

The invention claimed is:

1. A bolometer-type infrared detector having a laminated structure in which a first protective film, a light reflective film and a second protective film are provided in this order on a heat-sensitive element, wherein the first protective film is made of at least one selected from the group consisting of a metal oxide film, a metal nitride film, a polyimide, an acrylic resin and a fluororesin;

the light reflective film is a metal film;

the second protective film is made of at least one selected from the group consisting of a metal oxide film, a metal nitride film, a polyimide, an acrylic resin, and a fluororesin; and the heat-sensitive element is a carbon nanotube film.

2. The bolometer-type infrared detector according to claim 1, wherein the metal oxide film is a silicon oxide film.

3. The bolometer-type infrared detector according to claim 1, wherein the metal nitride film is a silicon nitride film.

4. The bolometer-type infrared detector according to claim 1, wherein the metal film is a titanium film.

5. The bolometer-type infrared detector according to claim 1, wherein the thickness of the first protective film is 1 to 1000 nm.

6. The bolometer-type infrared detector according to claim 1, wherein the thickness of the second protective film is 1 to 1000 nm.

7. The bolometer-type infrared detector according to claim 1, wherein the thickness of the light reflective film is 1 to 1000 nm.

8. The bolometer-type infrared detector according to claim 1, further comprising a niello film on the second protective film.

9. The bolometer-type infrared detector according to claim 1, having a structure in which the laminated structure is repeated multiple times.

10. A method for manufacturing a bolometer-type infrared detector comprising:

preparing a substrate with an insulating surface;

forming a heat-sensitive element support layer on the substrate;

forming a heat-sensitive element on the heat-sensitive element support layer;

forming an electrode pair on the heat-sensitive element;

forming a first protective film on the heat-sensitive element;

forming a light reflective film on the first protective film; and forming a second protective film on the light reflective film.

* * * * *